United States Patent [19]
Previsic et al.

[11] Patent Number: 5,329,497
[45] Date of Patent: Jul. 12, 1994

[54] DEVICE FOR GENERATION OF HYDRODYNAMIC POWER

[76] Inventors: Branislav Previsic, Oberschwändi, 8497 Fischenthal, Switzerland; Mile Previsic, Debaniceva 23, 41090 Zagreb,

[21] Appl. No.: 132,038

[22] Filed: Oct. 5, 1993

[30] Foreign Application Priority Data

Oct. 19, 1992 [CH] Switzerland .................... 03237/92

[51] Int. Cl.⁵ .................... H04R 23/00; F03B 13/10; F03B 13/12
[52] U.S. Cl. .................... 367/141; 290/42; 290/43; 290/53; 290/54
[58] Field of Search .................... 290/42, 43, 53, 54; 367/141

[56] References Cited

U.S. PATENT DOCUMENTS

| | | | |
|---|---|---|---|
| 4,295,635 | 10/1981 | Pustka et al. | 254/93 HP |
| 4,326,840 | 4/1982 | Hicks et al. | 417/331 |
| 4,531,063 | 7/1985 | Vielmo et al. | 290/53 |
| 4,756,267 | 7/1988 | Carr et al. | 114/230 |
| 4,819,547 | 4/1989 | Kukoij | 92/261 |
| 4,883,411 | 11/1989 | Windle | 417/331 |
| 5,136,173 | 8/1992 | Rynne | 290/53 |
| 5,176,552 | 1/1993 | Kuboyama et al. | 441/16 |

FOREIGN PATENT DOCUMENTS 3419565 11/1985 Fed. Rep. of Germany.
9207789 5/1992 World Int. Prop. O..

Primary Examiner—J. Woodrow Eldred
Attorney, Agent, or Firm—Bachman & LaPointe

[57] ABSTRACT

The device exploits the energy of waves (32) of an open water body (30). It comprises at least one fixed float (34), at least one extendable pumping element (10) and one pressure medium (24). The pumping element (10) attached to float (34) has at least one gas- and/or fluid-impermeable hose (12) which expands radially while shortening in the longitudinal direction and which has one inlet and/or outlet opening for at least one hydraulic and/or pneumatic pressure medium (24). On each hose (12) lie flexible longitudinal fibers (14) of high tensile strength, which run preferably parallel when extended. The fibers (14) have an upper force attachment (16) connected to the float (34) and a lower force attachment (18) connected to a fixing (38). The tensile force (Z) is applied in the longitudinal direction of the pumping element (10) and never to a hose.

Ideally the fibers (14) are arranged in guide rings (20) at regular intervals.

The device is used for example as an energy source for an electric power station, water supply, water storage, mixing and aeration of standing water and the desalination of sea water.

13 Claims, 12 Drawing Sheets

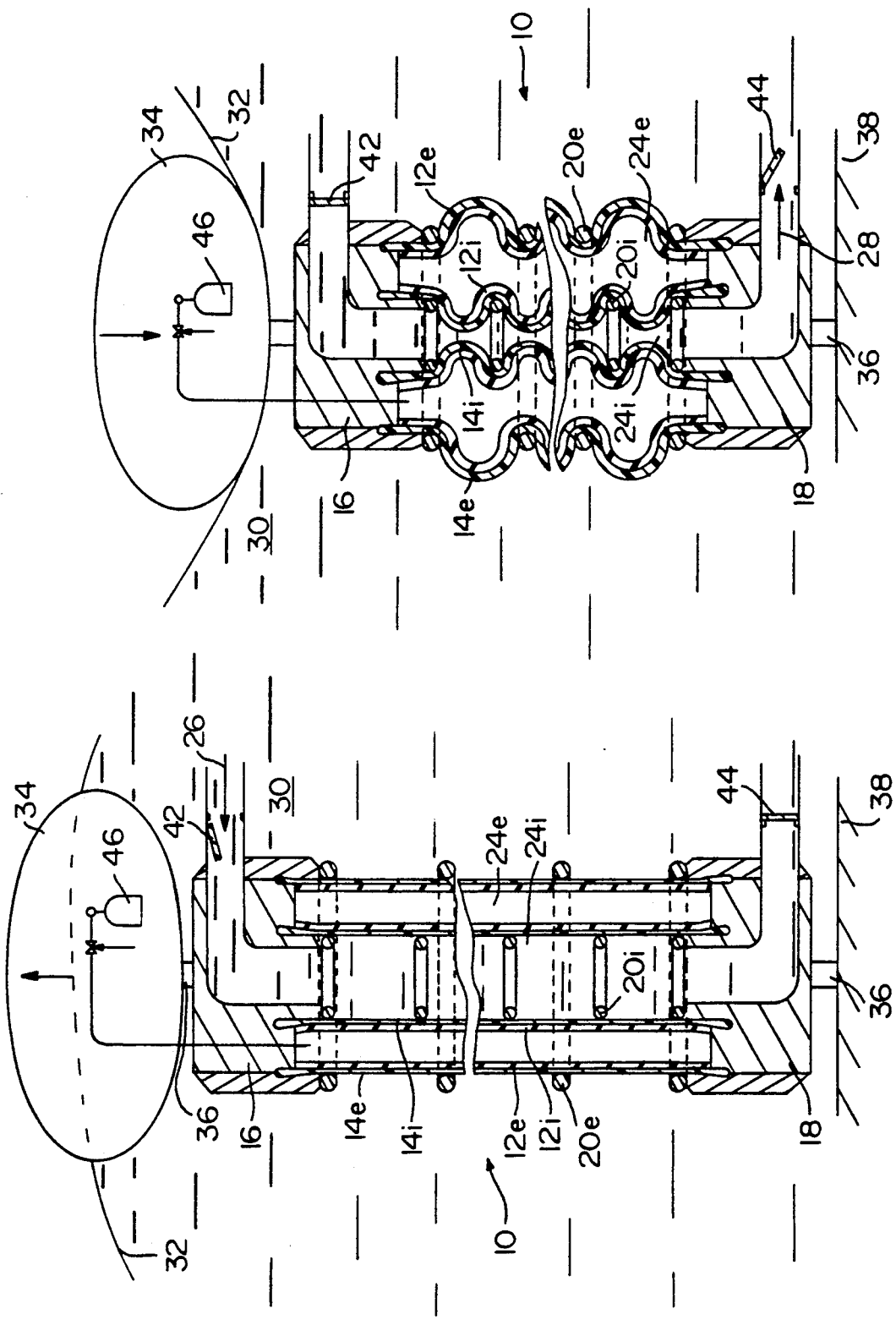

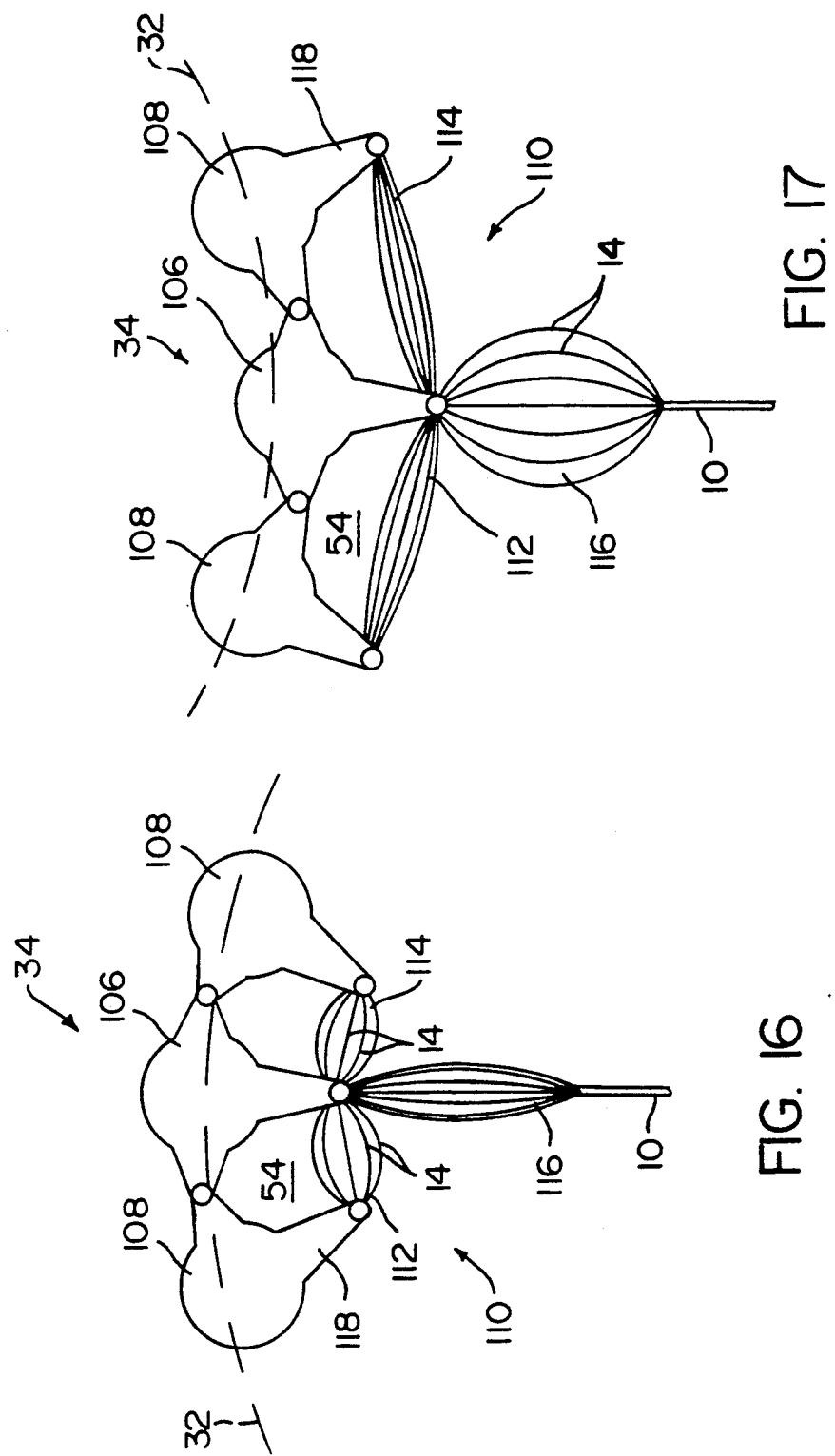

DEVICE FOR GENERATION OF HYDRODYNAMIC POWER

BACKGROUND OF THE INVENTION

The invention relates to a device for the generation of hydrodynamic power by conversion of the energy of waves of an open body of water, with at least one fixed float, at least one extendable pumping element and one pressure medium.

Waves of open bodies of water, in particular sea waves, have a high energy content, are practically inexhaustible, can be used without charge and processed without any ecologically harmful residue. Use of wave energy on an industrial scale is not yet known, mainly because of corrosion problems.

The energy content of waves is transferred by the circular oscillations of the water. These cause a float to lift, leading to a corresponding energy loss of the wave. Obviously a higher wave can give more energy than a low wave.

The power obtained from the wave movement can be converted to energy in the physical equation Work=Energy=Force×Distance.

DE,A1 3419565 lists numerous devices and processes which exploit the energy of sea waves. A device is described for the generation of hydraulic or electrical energy from sea waves using a floating body, an energy converter and a connecting element to the sea floor. The length of the connecting element can be changed, controllable by the working limits of the energy convertor and adaptable to the sea depths. The connecting element is also fitted with a device or guided via a device which increases the acting force or the path of the force. This increase is given via a lever ratio or a block and pulley device. It also shows how the float can develop its maximum lifting force in a specific immersion depth.

SUMMARY OF THE INVENTION

The task of the invention is therefore to create a device of the type described above which avoids the complicated mechanical devices such as levers and blocks and pulleys which are required to generate hydrodynamic power, and which as far as possible works with materials which are not sensitive or only slightly sensitive to corrosion.

The task is solved by the invention in that the pumping element attached to the float comprises at least one gas- and/or fluid-impermeable hose which expands radially while shortening in the longitudinal direction and which has one inlet and/or outlet opening for at least one hydraulic and/or pneumatic pressure medium, that each hose has flexible longitudinal fibers of high tensile strength which have an upper force attachment connected to the float and a lower force attachment connected to a fixing, so that the tensile force in the longitudinal direction of the pumping element is never applied to a hose. Special design forms and further developments of the device are shown herein.

The fibers with tensile strength preferably consist of known materials such as for example glass, carbon, silicon carbide, paramide, a plastic or a stainless steel. The fibers can also be coated in a known process.

The hose itself preferably consists of an elastic material which expands on introduction of a pressure medium. In one variant, the hose can have longitudinal folds in which longitudinal fibers are laid. Under the effect of pressure, the folds are extended which has the same effect for the fibers as the expansion of an elastic material. The flexible fibers with extremely low longitudinal elongation under tension follow the movement of the sheath, and the pump element is shortened because of the distortion of the fibers.

As a pumped pressure medium water is ideal, but any hydraulic or in certain cases pneumatic pressure medium can be suitable which can be obtained without harm to the environment at low cost and which is easy to handle. For the external stationary pressure medium of a double pumping element, compressed air and similar compressible gases are mainly suitable, but also fluids, again preferably water.

The pump elements shown herein can of course have other means of activation than waves, the only condition being an oscillating movement also combined with a rotation movement, for example a hand pump. the application limits lie mainly in the economic area as the drive energy must be cheap and readily available as is the case with wave energy in particular.

The device according to the invention has numerous possible applications, for example:
 the generation of electrical energy
 water pump for the supply and storage of water
 mixing and aeration of standing water
 desalination of seawater by inverse osmosis.

BRIEF DESCRIPTION OF THE DRAWINGS

The invention is explained in more detail using the design examples in the drawings. The drawings show:

FIG. 7 the functional structure of a double pump element at high tensile force;

FIG. 8 a pump element of FIG. 7 at low tensile force;

FIG. 16 an optimized float on a wave crest; and

FIG. 17 an optimized float in a wave trough.

DETAILED DESCRIPTION OF PREFERRED EMBODIMENTS

Figure 1:
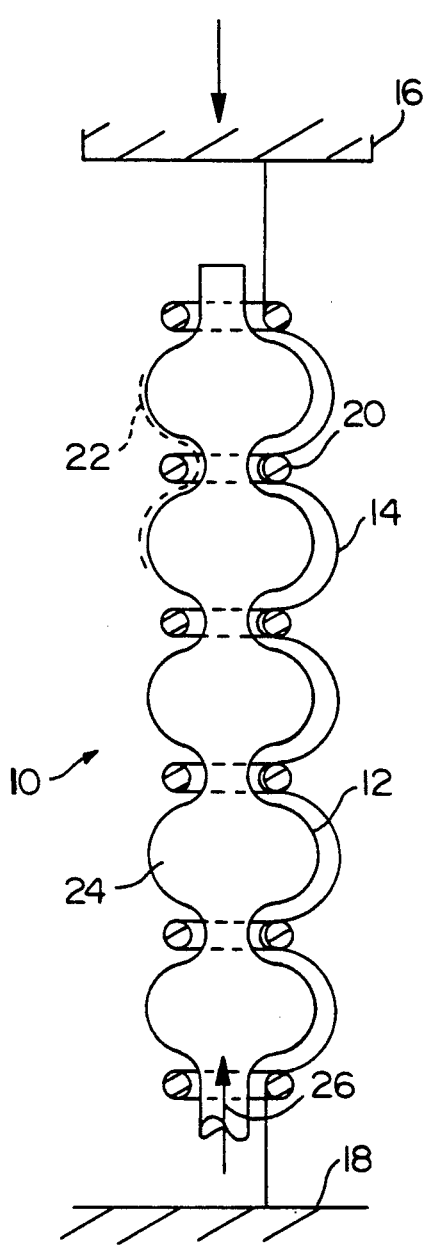
FIG. 1 the principle of a single pump element at low tensile force.
Figure 2:
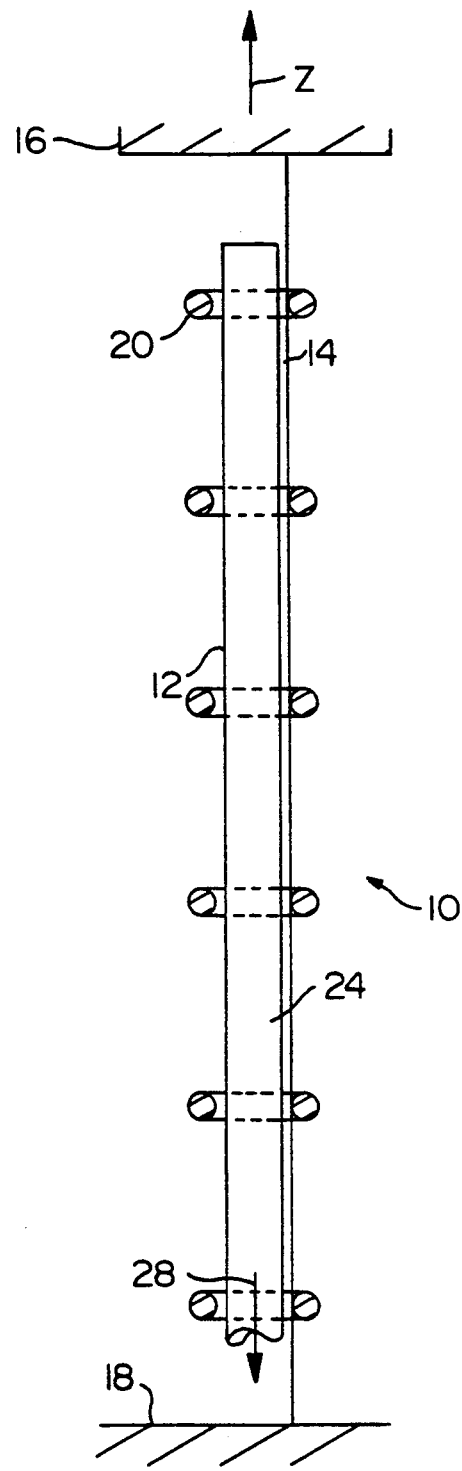
FIG. 2 the principle of a pump element of FIG. 1 at high tensile force.

A pumping element 10 shown in FIG. 1 and FIG. 2 essentially comprises a flexible, gas- and fluid-tight hose 12 with arranged thereon flexible fibers 14 with tensile strength, with an upper force attachment 16 which is arranged on a float (not shown) and a lower force attachment 18 which can be the foundation or attached to this.

At regular intervals, the hose is passed through a ring 20 also known as a clamping ring. These rings 20 can be attached to a protective sheath 22 shown partly in FIG. 1 so that with the hose stretched (FIG. 2) with parallel fibers 14, they cannot fall out. The term "ring" applies to all means of clamping eg. tires ring shaped chains etc.

FIG. 1 shows the condition under low tensile force. At low pressure, usually in the range of 1-10 bar above ambient water pressure, a pressure medium 24 is pumped in the direction of arrow 26 into the hose 12 shown closed at the top and largely unpressurized. Because of the slightly raised pressure, the hose bulges between the rings 20 taking fibers 14 with it.

In FIG. 2, the upper force attachment 16 lies essentially higher. The high tensile force Z applied stretches the fibers 14, which push the hose 12 into a straight almost tube-like form without significant bulges. The reduction in volume expels pressure medium 24 under high pressure which can amount to several hundred bar, in the direction of arrow 28.

FIGS. 1 and 2 clearly show that in its longitudinal direction, the direction of arrows 26, 28, no force acts on the hose 12.

A damage hose 12 can easily be replaced.

Figures 3, 4:
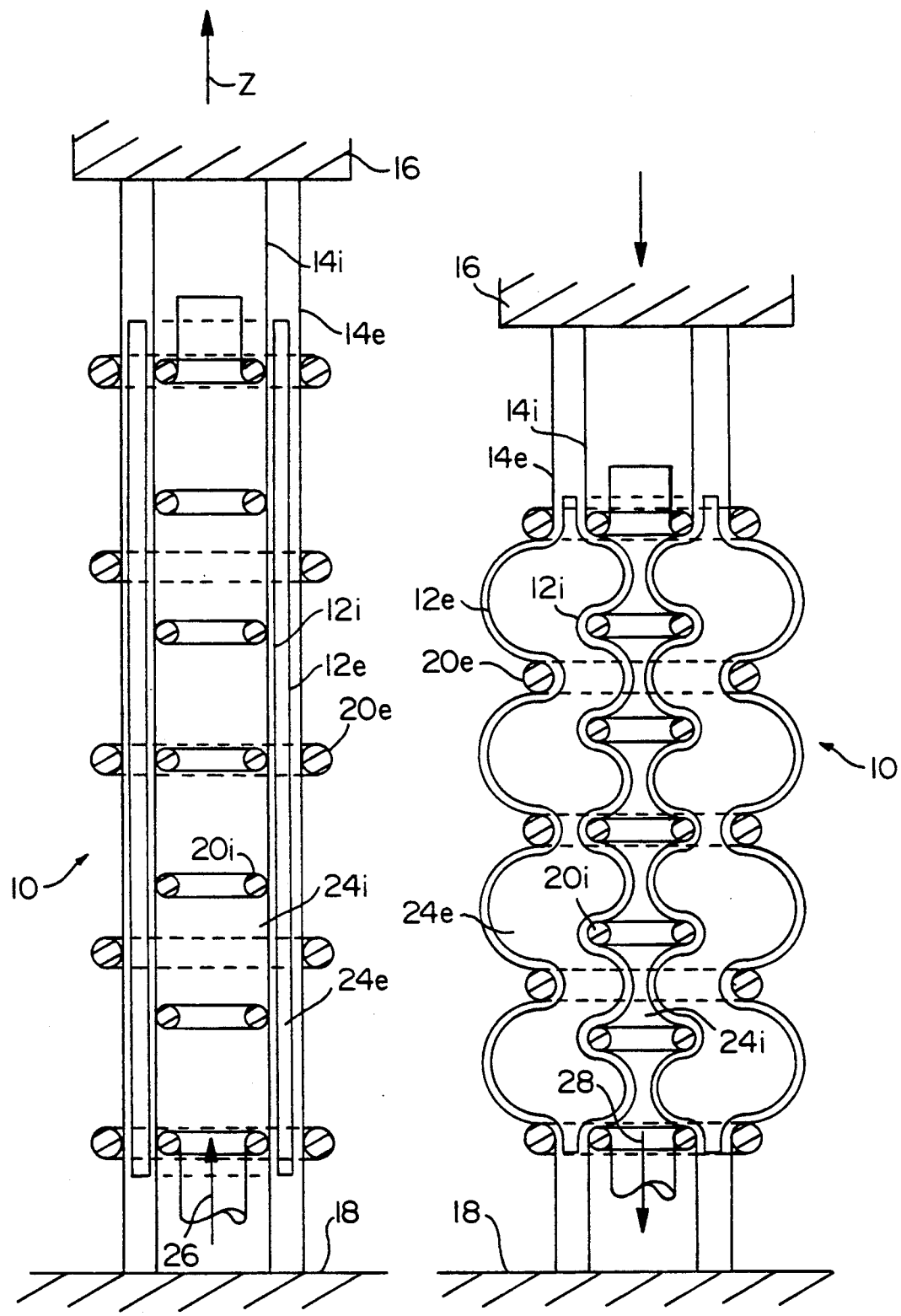
FIG. 3 the principle of double pump element at high tensile force.
FIG. 4 the principle of a pump element to FIG. 3 at low tensile force.

The design form of the pumping element of FIGS. 3 and 4 essentially differs in that the internal pressure medium $24_i$ flows in the direction of arrow 26 when the pump element is extended (FIG. 3), and as tensile force Z diminishes is pressed out in the direction of arrow 28.

This is achieved in that an inner hose $12_i$, supported by rigid internal rings $20_i$, and an outer hose $12_e$ also supported by flexible outer rings $20_e$, provides a flexible chamber for the outer pressure medium $24_e$, in this case elastic compressed air. The internal and external hoses $12_{i,e}$ also have internal and external fibers $14_{i,e}$ which completely absorb the tensile force.

The inner hose $12_i$ also defines a flexible chamber for the internal pressure medium $24_i$, which is pumped. The elastic external pressure medium $24_e$ presses the hoses $12_{i,e}$ apart with a pressure in the range of 5-10 bar, which is limited by the internal and external fibers $14_{i,e}$ and the surrounding internal and external rings $20_{i,e}$.

When the tensile force is removed (FIG. 4), the inner hose $12_i$ bulges outwards, so the internal pressure medium $24_i$ is forced in the direction of arrow 28. At high tensile force (FIG. 3), fibers $14_{i,e}$ are stretched parallel, the hoses $12_{i,e}$ are compressed more and more longitudinally by the fibers, leading to an increase in pressure in the outer pressure medium $24_e$, until they are practically cylindrical. The interior volume formed by the internal hose $12_i$ has multiplied in size, external pressure medium is drawn in in the direction of arrow 26 or transferred under hydrostatic pressure.

Figure 6:
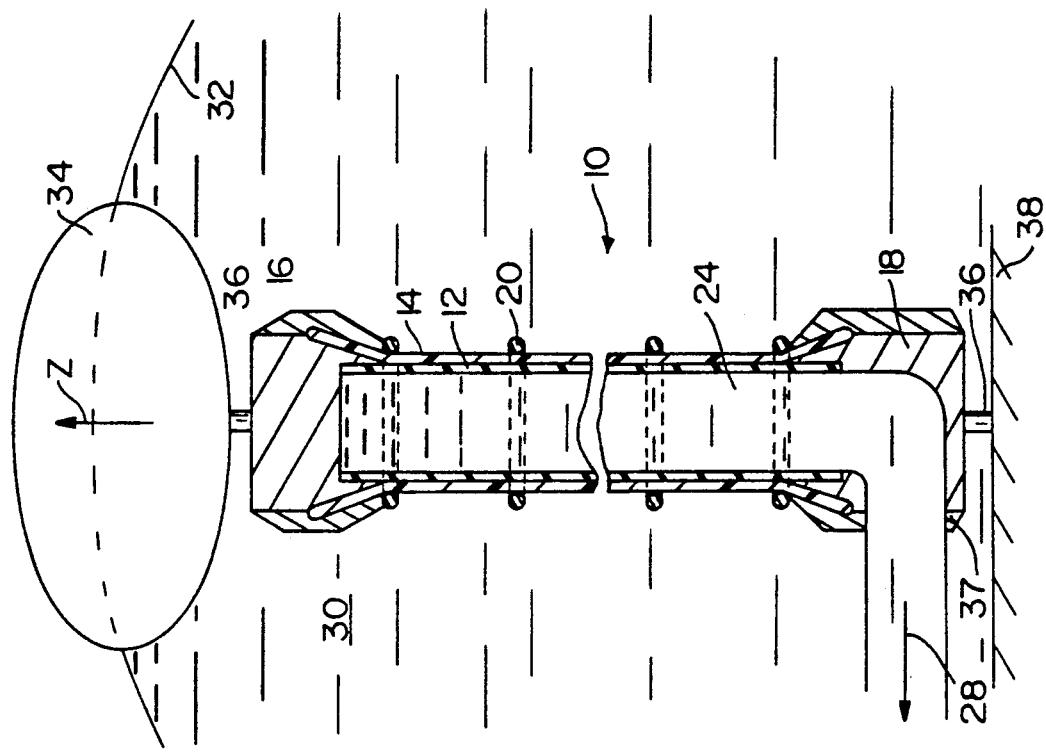
FIG. 6 a pump element of FIG. 5 at high tensile force.
Figure 5:
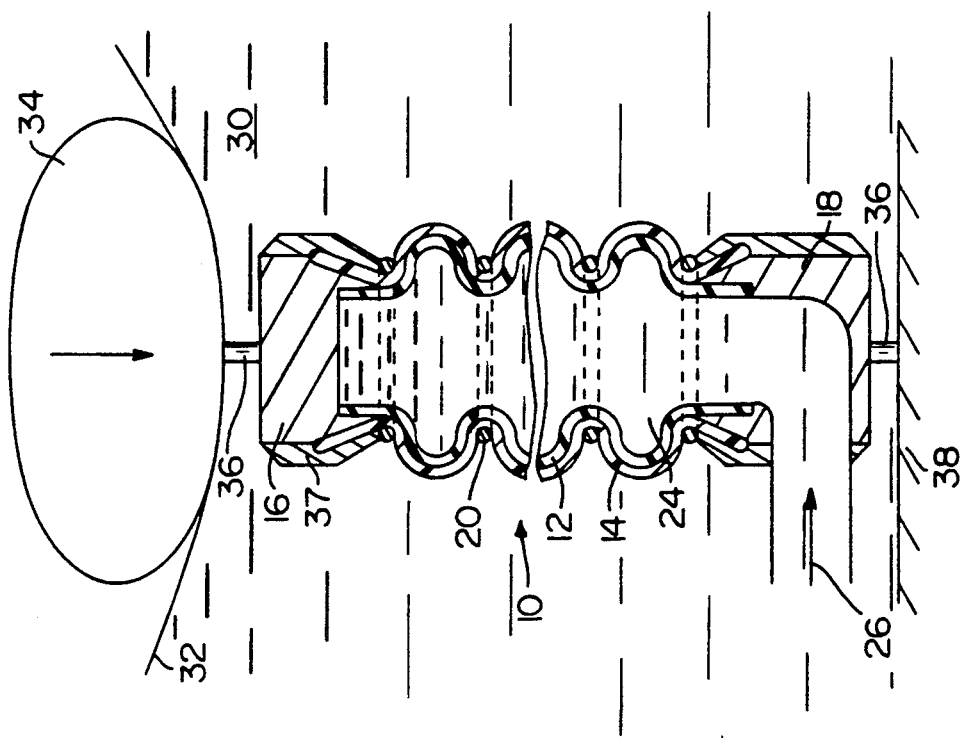
FIG. 5 the functional structure of a single pump element at low tensile force.

FIGS. 5 and 6 show the principle of a single pump element 10 of FIGS. 1 and 2 as a functional structure. In an open body of water 30, waves 32 are formed. FIG. 5 shows a float 34 in the area of a wave trough. The upper force attachment 16 of the pumping element 10 is connected to the float 34 via a tension element 36. The low position of the float 34 and hence of the upper force attachment 16 allow the hose 12 to bulge out under the low pressure of the pressure medium 24 flowing in the direction of arrow 26. The float 34 is only immersed slightly into water 30 as a consequence of the low load.

FIG. 6 shows float 34 raised in the area of a wave crest 32 and immersed up to half in the water 30. Because of the upward force of float 34 which can have a volume for example of 5 $m^3$ to far more than 100 $m^3$, a strong force is applied to the upper force attachment 16. The practically fully extended, parallel fibers 14 form hose 12 into a virtual cylinder. Thus, the internal pressure medium 24 is expelled in the direction of arrow 28.

Fibers 14 are firmly clamped into the upper and lower force attachment 16, 18, for which an overlap sleeve 37 is used. It is again clear that no tensile force Z is exerted on the hose 12. A concrete plate cast into the bed of the water body may serve for example as a fixing 38.

The working stroke $\Delta L$ corresponds to the difference in distance $L_1$ between the uppermost and lowest ring 20 according to FIG. 5 and the distance $L_0$ of these rings in FIG. 6.

The pump shown in FIGS. 7 and 8 for conveying surface water to a depth functions on the principle of FIGS. 3 and 4.

With regard to FIGS. 5 and 6 described above, the following differences apply:

The inner hose $12_i$ is open at the top and bottom, for which an inlet valve 42 and an outlet valve 44 are provided. During the raising of float 34 to its end position according to FIG. 7, the inlet valve 42 is open and surface water is drawn in. The outlet valve 44 however remains closed for deep water. In the sinking movement of the float 44 to its end position shown in FIG. 8 however, the outlet valve 44 in deep water is open and the oxygen rich surface water can flow out. The inlet valve 42 for surface water remains closed.

A compressed air storage unit 46 is arranged in float 34 which can maintain the high pressure of external pressure medium $24_e$. Numeral 46 can also refer to a general pressure medium storage unit, which in the case where a fluid is used as an external pressure medium $24_e$ must be elastic.

Figure 9:
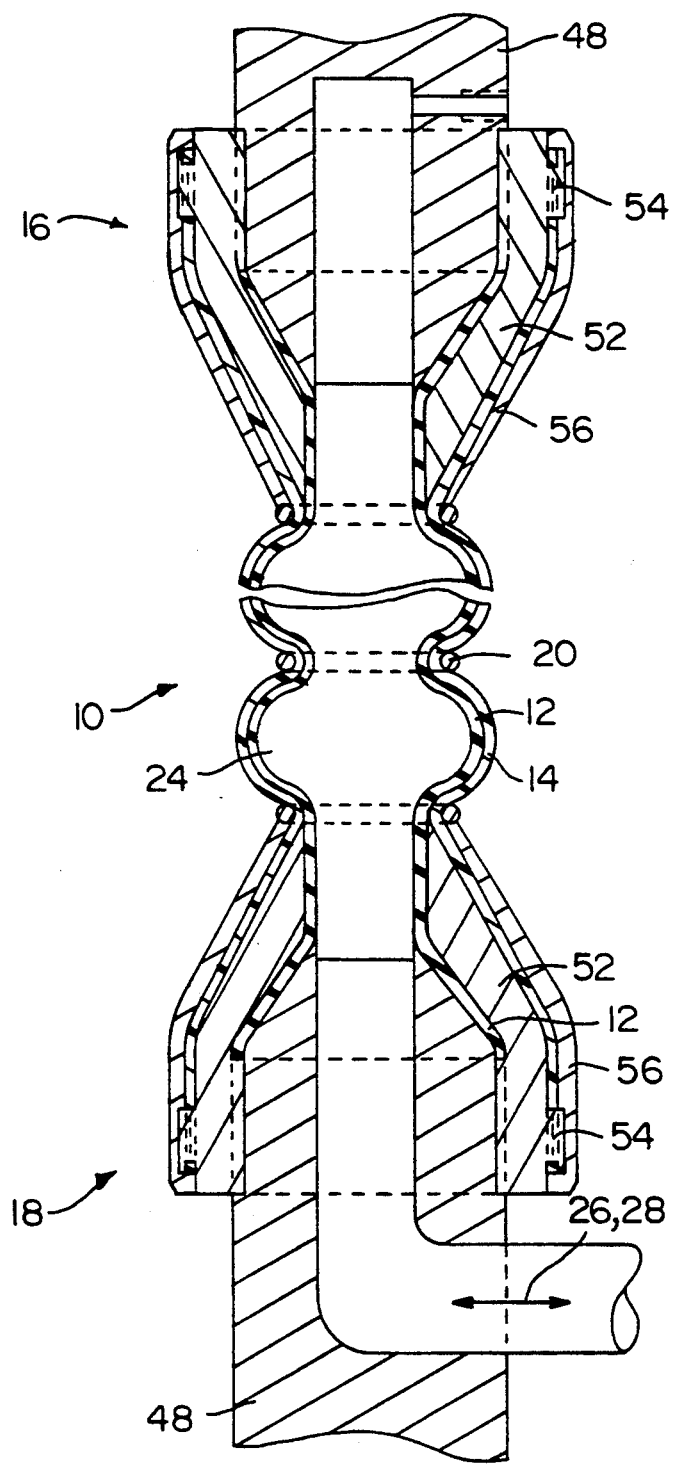
FIG. 9 a variant of a single pump element at low tensile force.

FIG. 9 shows in particular the fixing of the replaceable hose 12 and fibers 14 on the upper and lower force attachments 16, 18.

A connecting support 48 has a large axial bore for pressure medium 24 and a smaller radial hole as a ventilation outlet 50. The connecting carrier 48, which tapers in the direction of the functional pump element, forms the end of a cap-like fibre carrier 52 which firmly clamps the hose 12 so as to seal but not be tension-resistant. The fibers 14 are fixed to a fiber holder 54. Fiber carrier 52 with its fibers 14 is covered with fiber protection 56 designed as a protective sheath.

Figure 10:
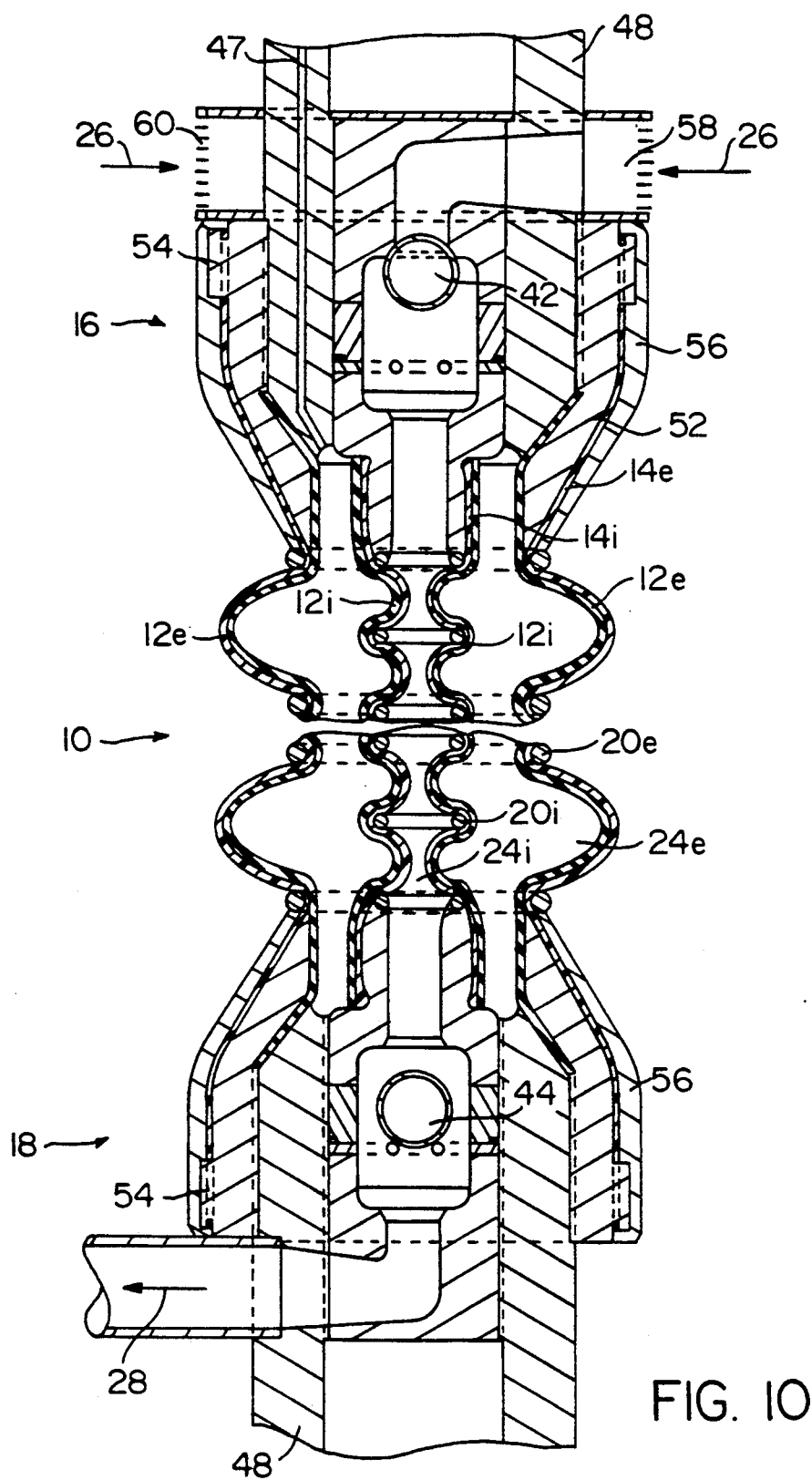
FIG. 10 a variant of a double pump element at low tensile force.

According to FIG. 10 with a double pumping element 10, a compressed air channel 47 leads to the flexible chamber formed by the inner and outer hoses $12_{i,e}$ with external pressure medium $24_e$. Obviously another external pressure medium than air can be passed through this channel 47.

The inlet of the internal pressure medium $24_i$ into the upper area is achieved in a ring chamber 58, which is protected from the outside by a cylindrical shell in the form of a grid 60. The inlet valve 42 and the outlet valve 44 have a spherical valve body which lies on the seat (inlet valve 42) or on a carrier (outlet valve 44).

Figure 11:
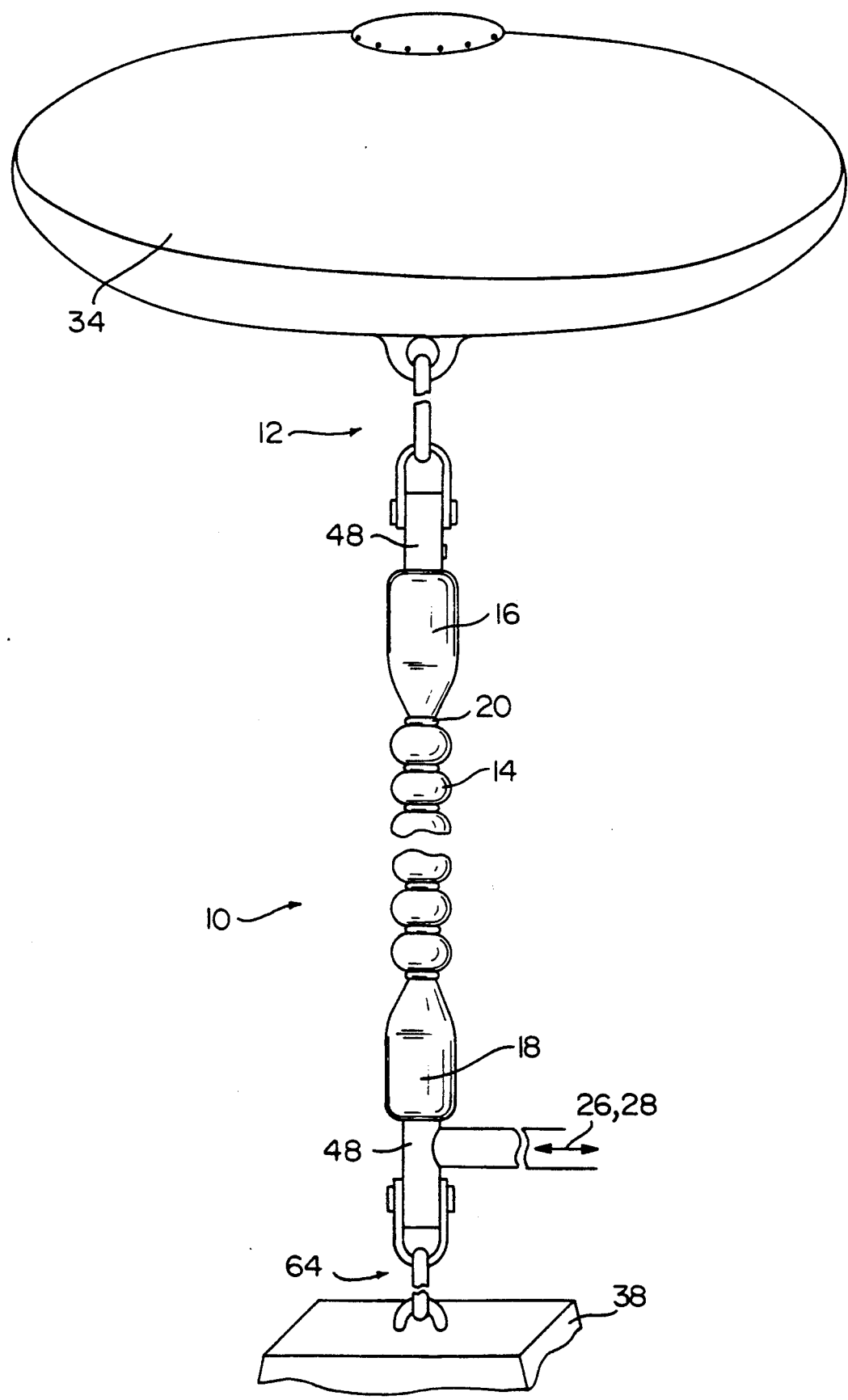
FIG. 11 a wave energy convertor with a single pump element.

FIG. 11 shows a wave energy convertor with a single pumping element 10 according to FIG. 9, and which is connected via its upper articulated joining element 62 to a float 34 and via lower articulated joining elements 64 to a fixing 38.

Figure 12:
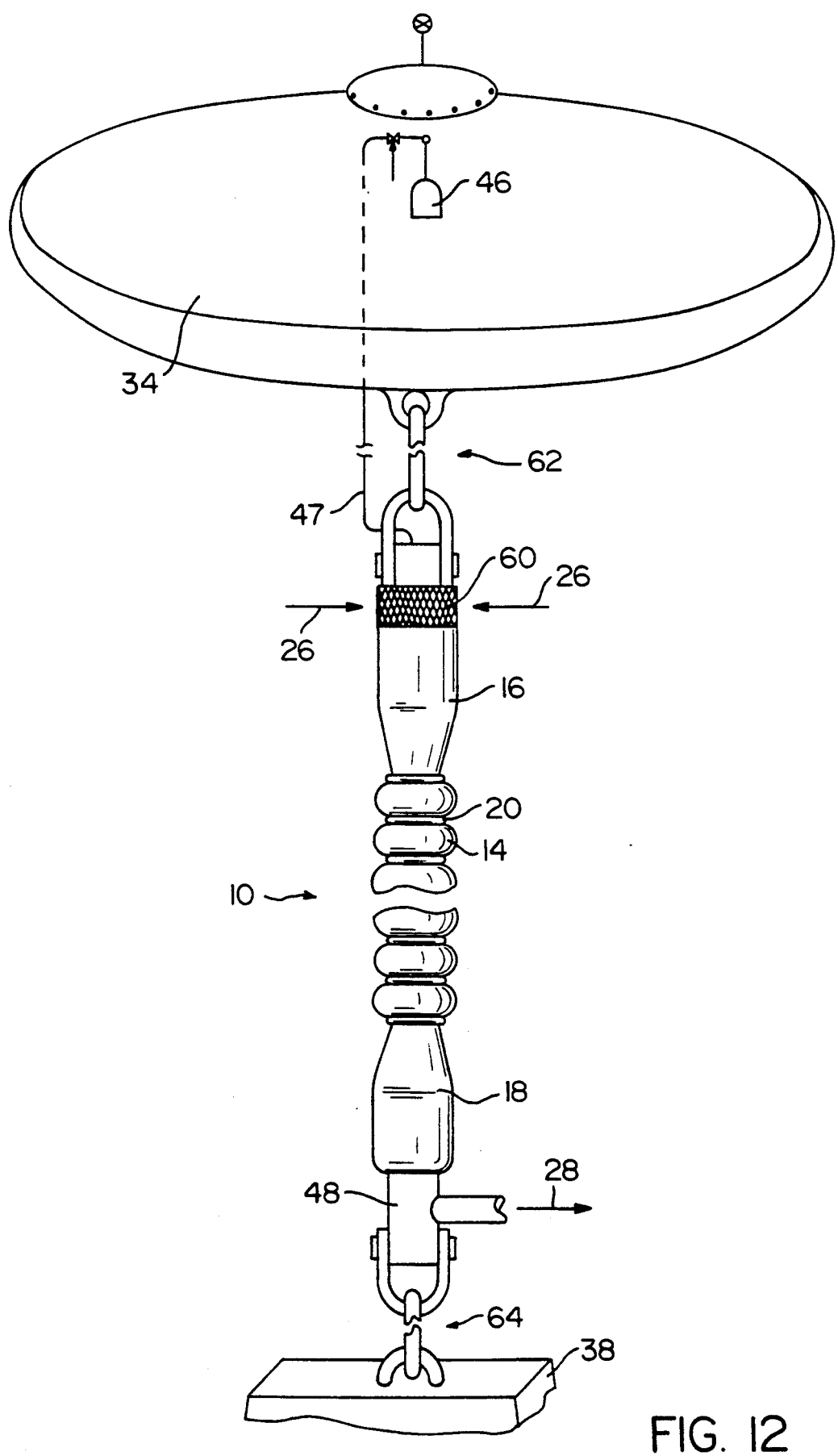
FIG. 12 a wave energy convertor with double pump element.

FIG. 12 shows a wave energy converter with a double pump element 10 according to FIG. 10, which is connected via its upper articulated joint 62 to a float 34 and via lower articulated joint 64 to a fixing 38.

Figure 13:
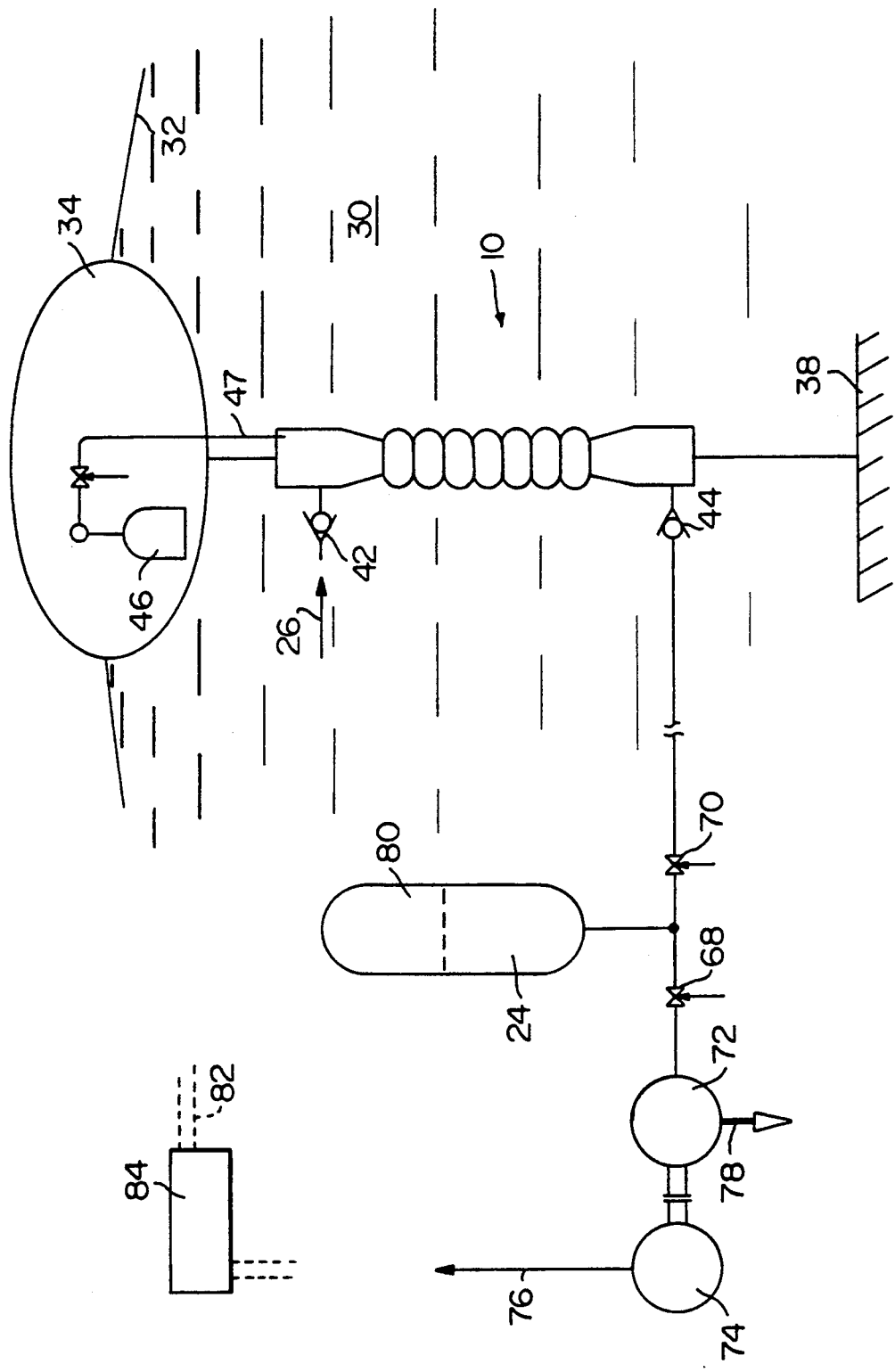
FIG. 13 a system of a wave power station with open pump circuit.

FIG. 13 shows a diagram of a wave power station with an open system. The single or double pump element 10 corresponds to the design forms shown before. With falling pressure, inlet valve 42 opens and allows water 30 to flow in as pressure medium 24. With rising pressure however, outlet valve 44 opens with inlet valve 42 closed as soon as the critical pressure on the high pressure side is exceeded. Via control valves 68, 70, the water under high pressure reaches a turbine 72 which in turn drives a generator 74 to generate electric current as shown by arrow 76. Arrow 78 indicates the water flowing out of turbine 72.

A high pressure storage unit 80 is used for compensation when no water is supplied by pumping element 10, when the high pressure unit discharges partially, but is refilled on the next movement of pump element 10.

A micro-processor 84 is connected to all control elements via lines 82, which are not shown in detail for the sake of clarity.

Figure 14:
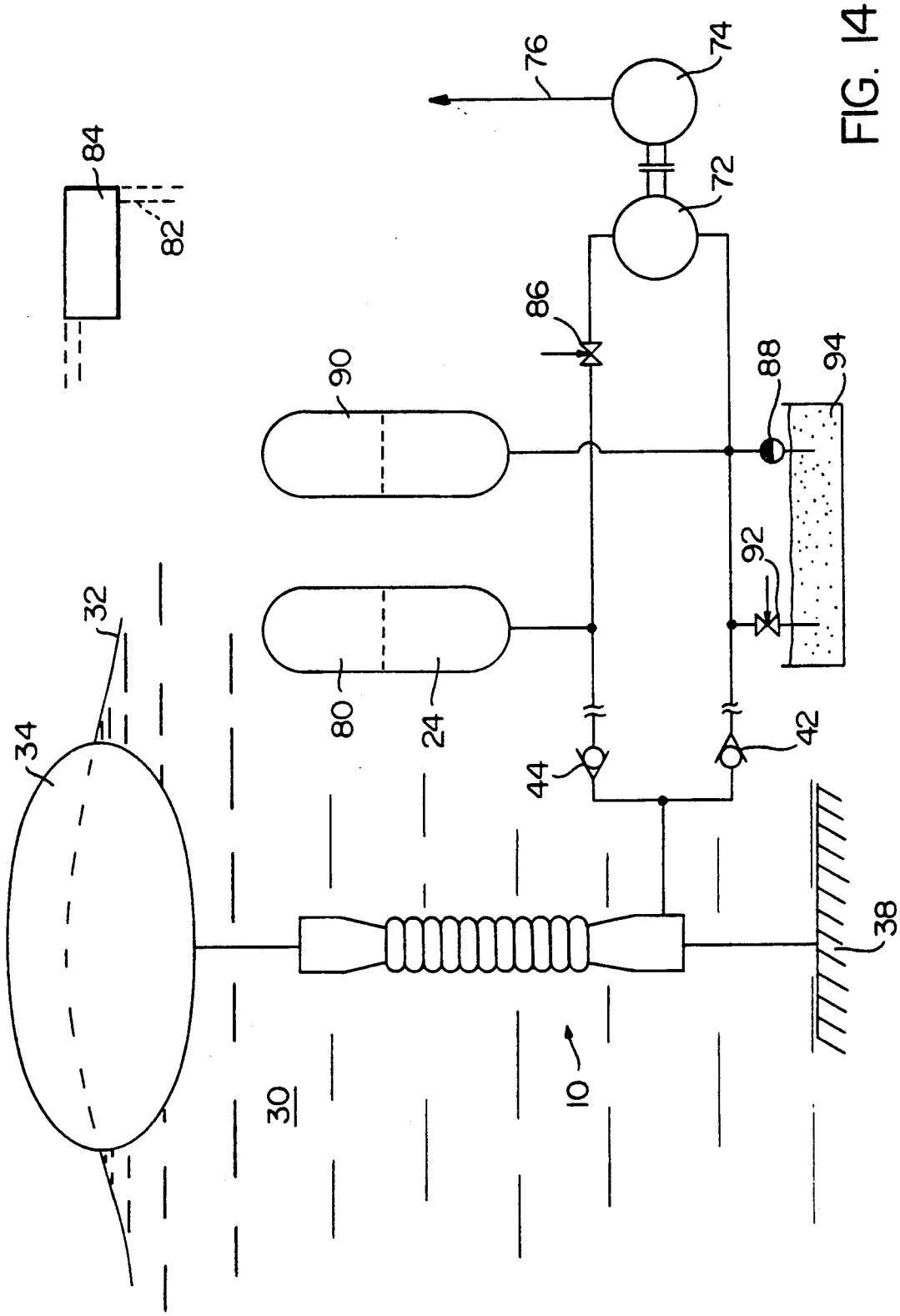
FIG. 14 a diagram of a wave power station with a closed pump circuit.

FIG. 14 shows a diagram of a wave power station with a closed circuit. Here the internal pressure medium 24 is preferably water, but may also be hydraulic oil. As in the open system of FIG. 13, a single or a double pump element 10 can be used e.g. of one of the previous figures.

At high pressure in a single pump element 10, the high pressure valve 44 in the form of an outlet valve opens, pressure medium 24 is passed to turbine 72 via a control valve 86, and the remainder fills the high pressure storage unit 80. When the pressure in pumping element 10 falls, high pressure valve 44 closes and when a preset value is reached, the low pressure valve 42 acting as an input valve opens. A supply pump 88 working with low pressure draws water from a compensation vessel 94 and passes this to pumping element 10 and also to low pressure storage unit 90 under the processor control. Another control valve 92 completes the closed hydraulic system.

Figure 15:
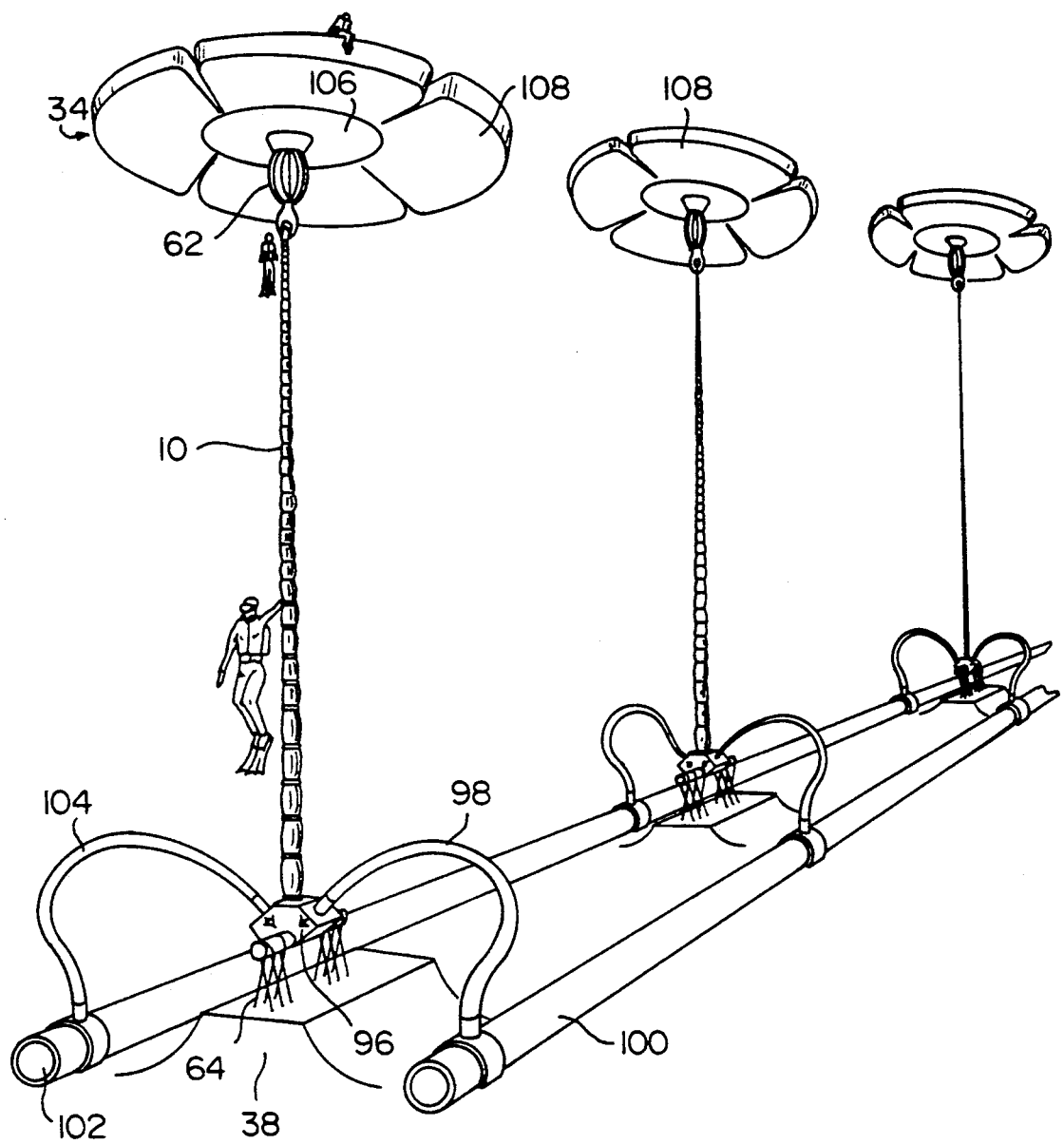
FIG. 15 a wave power station with parallel pump elements.

FIG. 15 shows several floats 34 which are connected to a hydraulic system via a pumping element 10, shown in part. Several pumping elements 10 can be connected to the same float 34, for example up to 20.

The frogmen shown indicate the height of the unit, which can be up to 30 m.

The outer parts 108 of float 34 are attached flexibly to a centre part 106, where the form of the waves can be exploited functionally as shown in FIGS. 16 and 17 to increase the working stroke ΔL (FIGS. 5, 6).

The known fixings of float 34 have been omitted for the sake of clarity.

A fitting 96 attached flexibly in the foundation 38 contains a high pressure valve (44 in FIG. 14), which on opening passes a high tension pressure medium via a high pressure line 98 to a high pressure pipe 100, and a low pressure valve (42 in FIG. 14), which on opening allows the depressurized medium to flow out of the low pressure pipe 102 via a low pressure line 104 into pumping element 10. Several pumping elements per float 34 have a common high and low pressure valve. FIGS. 16 and 17 show a three-part float 34 on a crest and in a trough of a wave 32. With such a float 34 which has a centre part 106 and flexibly attached side parts 108, the wave movement can be exploited to an optimum as the vertical path of float 34 and hence the working stroke ΔL is enlarged. The optimization device 110 consists of three hoses 112, 114 and 116 reinforced with fibers 14, which are connected together and contain a prestressed fluid or gaseous pressure medium. The entire tensile force of the device falls upon fibers 14 of sheath 116. These fibers 14 can also be made integral with those of pumping element 10. Fibres 14 of hoses 112 and 114 are connected with the longitudinal rib 118 of center part 106 and a longitudinal rib 118 of each side part 108 of the float 34. There is no communicating link of the pressure medium to the hoses of the tensile element 10.

We claim:

1. Device for generating hydrodynamic power by converting the energy of waves of an open body of water, which comprises at least one anchored float, at least one extendable pumping element attached to the float, and a pressure medium within the pumping element, wherein the pumping element comprises at least one fluid impermeable hose which expands radially while shortening in the longitudinal direction and which has at least one of an inlet opening and an outlet opening for at least one pressure medium, wherein said hose has flexible longitudinal fibers of high tensile strength operatively associated therewith, an upper force attachment connected to the float and fibers and a lower force attachment connected to the fibers and a fixing means so that a tensile force applied in the longitudinal direction of the pumping element is not applied to the hose.

2. Device according to claim 1 including a single pumping element which comprises a hose with external rings.

3. Device according to claim 2 wherein said external rings are arranged at regular intervals and fibers extend between the hose and the rings.

4. Device according to claim 1 including a double pumping element which comprises an outer hose and an inner hose, with external rings arranged outside the outer hose and inner rings arranged inside the inner hose at regular intervals, and external fibers extending between the outer hose and the outer rings and internal fibers extending between the inner hose and the inner rings, wherein within the inner hose is a flexible chamber for an internal pressure medium, and between the inner and outer hoses is a flexible chamber for an outer pressure medium.

5. Device according to claim 4 wherein the hoses are interchangeable.

6. Device according to claim 4 wherein the hoses consist of a thin layer covered with a protective sheath in the direction of the fibers, wherein the protective sheath comprises fixing means for the rings.

7. Device according to claim 1 wherein at least one float includes at least one pumping element, wherein all pumping elements of a float have a high pressure line to a common high pressure tube, and in a closed system a low pressure line to a common low pressure pipe of several floats.

8. Device according to claim 1 wherein a pumping element designed as an open system has at least one inlet valve and one outlet valve for a pumped pressure medium, with regular output of a high pressure medium, and including a high pressure storage unit connected to the pumping element, and control valves and a processor control connected to the high pressure storage unit.

9. Device according to claim 1 wherein a pumping element designed as a closed system has a high pressure valve, a high pressure control valve and a low pressure valve for a pumped pressure medium, with regular output of high pressure medium, and including connected to the pumping element a high pressure storage unit, a low pressure supply pump, a low pressure supply unit, a compensation vessel and a low pressure control valve.

10. Device according to claim 4 wherein the float has a storage unit for an outer pressure medium, including a pressure line for the outer pressure medium leading to a flexible chamber between the inner and outer hose.

11. Device according to claim 1 wherein the float consists of at least three parts, with a center part and outer or side parts following the wave shape to enlarge the working stroke.

12. Device according to claim 1 including an inner hose and an outer hose, wherein the hoses are interchangeable.

13. Device according to claim 1 wherein said at least one hose includes external rings and consists of a thin layer covered with a protective sheath in the direction of the fibers wherein the protective sheath comprises fixing means for the rings.

* * * * *